(12) United States Patent
Hollender et al.

(10) Patent No.: US 10,928,815 B2
(45) Date of Patent: Feb. 23, 2021

(54) COMPUTER SYSTEM AND METHOD TO PROCESS ALARM SIGNALS

(71) Applicant: ABB Schweiz AG, Baden (CH)

(72) Inventors: Martin Hollender, Dossenheim (DE); Matus Harvan, Zurich (CH)

(73) Assignee: ABB SCHWEIZ AG, Baden (CH)

(*) Notice: Subject to any disclaimer, the term of this patent is extended or adjusted under 35 U.S.C. 154(b) by 0 days.

(21) Appl. No.: 16/281,117

(22) Filed: Feb. 21, 2019

(65) Prior Publication Data

US 2019/0187672 A1 Jun. 20, 2019

Related U.S. Application Data

(63) Continuation of application No. PCT/EP2017/067537, filed on Jul. 12, 2017.

(30) Foreign Application Priority Data

Aug. 25, 2016 (EP) .................................... 16185660

(51) Int. Cl.
*G05B 23/02* (2006.01)
*G06Q 10/00* (2012.01)
*G05B 19/042* (2006.01)

(52) U.S. Cl.
CPC ....... *G05B 23/027* (2013.01); *G05B 19/0428* (2013.01); *G05B 23/0267* (2013.01);
(Continued)

(58) Field of Classification Search
CPC .............. G05B 23/027; G05B 23/0278; G05B 19/0428; G05B 23/0267; G05B 23/0272; G05B 2223/06; G06Q 10/00
See application file for complete search history.

(56) References Cited

U.S. PATENT DOCUMENTS 9,608,856 B2 * 3/2017 Ebel ..................... H04L 41/0604
2006/0058898 A1 * 3/2006 Emigholz ............ C10G 11/187
700/29

(Continued)

FOREIGN PATENT DOCUMENTS

EP 2720100 A1 4/2014
EP 3026518 A1 6/2016

*Primary Examiner* — Ramesh B Patel
(74) *Attorney, Agent, or Firm* — Leydig, Voit & Mayer, Ltd.

(57) ABSTRACT

A computer system is configured to process alarm activations received from technical systems, where an alarm activation represents a deviation of the technical status of a technical system from normal. The system includes: a data storage interface for receiving alarm activations in data storage, where the recorded alarm activations correspond to alarms; a data processor for: determining, from the recorded alarm activations, time intervals for alarm analysis; and computing similarity measures between the time intervals that depend on the occurrence of the recorded alarm activations in the time intervals, and where the contribution of an alarm activation to the similarity of two time intervals is reduced with an increasing occurrence of the alarm in the time intervals; and a user interface configured to provide pairs of time intervals to an operator of the one or more technical systems that include time intervals with similarity measures indicating similar alarm.

16 Claims, 6 Drawing Sheets

(52) U.S. Cl.
CPC ......... *G05B 23/0278* (2013.01); *G06Q 10/00* (2013.01); *G05B 23/0272* (2013.01); *G05B 2223/06* (2018.08)

(56) References Cited

U.S. PATENT DOCUMENTS

| | | | | |
|---|---|---|---|---|
| 2008/0161958 | A1* | 7/2008 | Davidson | G05B 15/02 700/109 |
| 2009/0216573 | A1* | 8/2009 | Heiberg-Andersen | G05B 23/0272 702/60 |
| 2009/0278680 | A1* | 11/2009 | Hollender | G05B 23/0216 340/514 |
| 2010/0109860 | A1* | 5/2010 | Williamson | G08B 29/22 340/508 |
| 2010/0141421 | A1* | 6/2010 | Lagnelov | G05B 23/0267 340/506 |
| 2011/0004885 | A1* | 1/2011 | Kikuchi | H04L 41/5096 718/104 |
| 2011/0144776 | A1* | 6/2011 | Hollender | G05B 23/0272 700/49 |
| 2012/0119901 | A1* | 5/2012 | Hollender | G05B 23/0272 340/501 |
| 2013/0063264 | A1* | 3/2013 | Oktem | G05B 23/0278 340/540 |
| 2014/0097952 | A1* | 4/2014 | Shaw | G05B 23/0272 340/517 |
| 2015/0123784 | A1* | 5/2015 | Ebel | H04L 41/0604 340/517 |
| 2016/0328954 | A1* | 11/2016 | Ramadoss | G05B 19/0428 |
| 2016/0371327 | A1* | 12/2016 | Hoernicke | G05B 23/027 |
| 2019/0073609 | A1* | 3/2019 | Hollender | G05B 23/0232 |

\* cited by examiner

COMPUTER SYSTEM AND METHOD TO PROCESS ALARM SIGNALS

CROSS-REFERENCE TO PRIOR APPLICATIONS

This application is a continuation of International Patent Application No. PCT/EP2017/067537, filed on Jul. 12, 2017, which claims priority to European Patent Application No. EP 16185660.4, filed on Aug. 25, 2016. The entire disclosure of both applications is hereby incorporated by reference herein.

FIELD

The present invention generally relates to alarm signal processing, and more particularly, relates to methods, computer program products and systems for handling alarm floods.

BACKGROUND

Many technical systems, such as for example automation systems, can generate alarms to indicate to an operator a need to interact with the technical system in order to take corresponding action in response to the generated alarm. Alarm, as used herein and as defined in the technical standard IEC 62682 section 3.1.7, is an audible and/or visible means of indicating to the operator of an equipment an equipment malfunction, process deviation, or abnormal condition requiring a timely response (see also ISA-18.2). An instance of a particular alarm is referred to as an alarm activation.

In real world situations, often a series of alarm activations are generated which depend on a single root cause where actually a single alarm would be sufficient to indicate the problem in the technical system. Such series of alarm activations are usually referred to as alarm floods. Alarm flood situations are characterized by a combination of a plurality of alarm activations which occur repeatedly. In other words, the same or similar combinations of alarms typically appears in multiple alarm floods. In general, permanent high alarm rates indicate bad alarm quality. Good alarm quality is achieved when: each alarm alerts, informs and guides; alarms are presented at a rate that operators can deal with; and detectable problems are alarmed as early as possible.

Available alarm management tools (e.g., System 800xA Alarm Management, Alarm Life Cycle Management, AlarmInsight all provided by ABB with headquarter in Zurich, Switzerland) can identify correlated pairs of alarms. An approach shown by Cheng et al. [cf. Yue Cheng, Iman Izadi, Tongwen Chen (2013) Pattern matching of alarm flood sequences by a modified Smith-Waterman algorithm. Chemical Engineering Research and Design Vol. 91 issue 6] can identify longer alarm sequences in an exact order. These algorithms are computationally very demanding and need intensive data cleaning and preparation. The selection of inappropriate parameters can lead to computation times of days. In addition, causal alarm chains do not necessarily always have the exact same order due to variability or disturbances. There is therefore a need to improve alarm flood detection for applications with quasi-real-time requirements where computation times of less than a second may be required.

SUMMARY

An embodiment of the present invention provides a computer system that is configured to process alarm activations received from one or more technical systems, where a particular alarm activation represents a deviation of the technical status of a particular technical system from its normal technical status. The computer system includes: a data storage interface configured to received alarm activations in a data storage unit, where the recorded alarm activations correspond to one or more alarms; a data processor configured: to determine, from the recorded alarm activations, time intervals for alarm analysis; and to compute similarity measures between the determined time intervals, where the similarity measures depend on the occurrence of the recorded alarm activations in the determined time intervals, and where the contribution of a particular alarm activation to the similarity of two time intervals is reduced with an increasing occurrence of the alarm in the determined time intervals; and a user interface configured to provide one or more pairs of time intervals to an operator of the one or more technical systems wherein the one or more pairs of time intervals include time intervals with similarity measures indicating similar alarm floods in the respective time intervals.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Prompting an operator with all alarm activations of an alarm flood causes unnecessary consumption of computing resources and display space because the alarm flood typically includes too much information, which does not really contribute to the indication of the root cause for the alarm flood. Prompting the operator only with relevant or characterizing alarms of the alarm flood is advantageous because it allows the operator to quickly react to the alarms and re-adjust the technical status of the monitored technical system to re-ensure proper operation of the system. There is therefore a need to reduce the number of alarms in an alarm flood to relief an alarm system from unnecessary computational tasks and to prompt the operator with such alarm information, which is relevant for re-adjusting the technical status of the system.

Embodiments of the present invention recognize that the less frequent a particular alarm signal occurs outside of alarm floods, the more characteristic it is for an alarm flood. If several alarm signals frequently occur together (within a given time interval) they are candidates for alarm suppression rules (e.g., if alarm A is active, do not show alarms B, C or D). The disclosed systems, methods and computer programs identify alarms that have frequently occurred together in the past and are therefore candidates for alarm suppression rules or similar methods to reduce redundant alarms.

Further, where several time intervals include a collection of alarm activations, which classify a specific situation (e.g., trip due to power dip) and several other time intervals are known to not correspond to that specific situation, the disclosed method/system can determine one or more so-called characteristic alarm(s) that allow to identify the specific situation based on the characteristic alarm(s). For example, in the context of alarm management, trip has the meaning that a technical component (e.g., a compressor) needs to be switched off or shut down for a particular reason (e.g., not enough electricity provided) so that it is not available any more. The power dip in this case may be a kind of lead indicator for the specific situation that provides good information regarding what needs to be done by the operator to remedy the situation.

In one embodiment, a computer system processes alarm activations received from one or more technical systems. A particular alarm activation indicates a deviation of the technical status of a particular technical system from its normal technical status. In other words, an alarm indicates an abnormal technical status. The normal technical status is the status of the system when it is operated under normal (default) conditions. For example, a temperature may be too high, a pressure may be too low, an equipment component may broadcast an error status, etc. Typically, such alarm activations are generated by alarm generators in the technical system(s) based on respective sensor data and alarm rules configured to check if sensor data is within the tolerance ranges specifying normal operation of the technical system(s). If not, a corresponding alarm activation may be generated.

A data storage component records a plurality of received alarm activations wherein the recorded alarm activations correspond to one or more alarms. In other words, the data storage component tracks the history of alarm activations generated by the technical system(s) and received by the computer system. Technical standards such as the above mentioned standard for alarms define interfaces and communication protocols to enable the computer system to receive the plurality of alarm activations. The received alarm activations may be stored cumulatively (continuously over time) or they may be stored over predefined time intervals (e.g., a day, a week, a month, etc.). The data storage component may be a distributed component where parts of the data storage can also be located outside the computer system. For example, the data storage can use multiple servers providing memory portions allocated to the data storage component. In such a setup, the data storage space can easily be increased by adding additional memory resources dependent on the memory already consumed by the recorded historic alarm data.

The computer system further includes a data processing component for analyzing the recorded alarm data. One function of the data processing component is adapted to determine a plurality of time intervals for the alarm analysis from the recorded alarm activations.

In one embodiment, a particular time interval of the plurality of time intervals is determined if the alarm activation rate exceeds a predefined alarm threshold value per predefined time unit. In other words, such a time interval is dynamically determined based on the number of the actually received alarm activations in a given time and the length of the determined time intervals may vary. Further, the determined time intervals may be interrupted by other time intervals that are not determined by processing component.

In another embodiment, a particular time interval of the plurality of time intervals is determined by a fixed starting time and a fixed time length. In other words, in this embodiment, each time interval has the same length and the determined time intervals are not interrupted by other time intervals but each determined time interval directly follows the previously determined time interval.

The processing component then computes similarity measures between the determined time intervals wherein the similarity measures depend on the occurrence of the recorded alarm activations in the determined time intervals. The contribution of a particular alarm activation to the similarity of two time intervals is reduced with an increasing occurrence of the alarm in the determined time intervals.

For example, in one embodiment, the similarity measure between a first and a second determined time interval corresponds to a rank that is computed as the sum of coefficients related to alarms occurring in both time intervals wherein the coefficients decrease with the frequency at which an alarm occurs in the determined time intervals.

The computer system further has a user interface component to provide one or more pairs of time intervals to an operator of the one or more technical systems wherein the one or more pairs of time intervals include time intervals with similarity measures indicating similar alarm floods in the respective time intervals. For example, the similarity measures may exceed a predefined or a dynamically determined similarity threshold value. In other words, when the processing component identifies pairs of time intervals with a similarity degree implying a high probability that the same or similar alarm floods are included in the respective pairs, the information is provided to one or more operators of the respective technical system(s) as an indicator for a particular alarm flood occurring in both of the two time intervals.

In one embodiment, the user interface component may receive an alarm flood type, (e.g., from the operator, or from an alarm classification sub-system). The alarm flood type may characterize a particular technical system status and the technical reason for a corresponding alarm flood based on the collection of alarms in the particular alarm flood. In other words, the alarm flood type can be used to characterize the particular alarm flood with regards to its root cause. The characterization may be done by an operator, or automatically by an alarm classifier (e.g., a machine-learning based classifier that has been trained with training sets of possible alarm floods). The data processing component may then identify time intervals with alarm floods of the received alarm flood type by comparing the collection of alarms in a given time interval with the collection of alarms characterizing the received alarm flood type.

In one embodiment, the data processing component can identify a second set of time intervals where the received alarm flood type does not apply. It can then determine a weight for each alarm occurring in all time intervals of the first set wherein the weight decreases with a growing number of occurrences of the respective alarm in time intervals of the second set, and select the alarm with the highest weight as a characterizing alarm for the received alarm flood type. For example, in cases where two alarms have the same highest weight the alarm which occurs in a lower number of time intervals may be weighted higher.

In one embodiment, a computer-implemented method is provided for processing alarm activations received from one or more technical systems wherein a particular alarm activation represents a deviation of the technical status of a particular technical system from its normal technical status. The method includes: recording a plurality of received alarm activations in a data storage component wherein the recorded alarm activations correspond to one or more alarms; determining a plurality of time intervals for alarm analysis; computing similarity measures between the determined time intervals wherein the similarity measures depend on the occurrence of the recorded alarm activations in the determined time intervals, and wherein the contribution of a particular alarm activation to the similarity of two time intervals is reduced with an increasing occurrence of the alarm in the determined time intervals; and providing pairs of time intervals to an operator of the one or more technical systems wherein the pairs of time intervals include time intervals with similarity measures indicating similar alarm floods in the respective time intervals.

The method may further include: receiving an alarm flood type, the alarm flood type characterizing a particular technical status of the technical system and the technical reason for a corresponding alarm flood based on the collection of alarms in the particular alarm flood; and identifying a first set of time intervals with alarm floods of the received alarm flood type by comparing the collection of alarms in a given time interval with the collection of alarms characterizing the received alarm flood type.

The method may further include: identifying a second set of time intervals where the received alarm flood type does not apply; determining a weight for each alarm occurring in all time intervals of the first set wherein the weight decreases with a growing number of occurrences of the respective alarm in time intervals of the second set; and selecting the alarm with the highest weight as a characterizing alarm for the received alarm flood type.

In one embodiment, if two alarms have the same highest weight, the alarm that occurs in a lower number of time intervals is weighted higher.

Selecting the alarm with the highest weight as a characterizing alarm may further include: selecting a plurality of characterizing alarms for the received alarm flood type by primarily sorting the alarms of the first set by weight in descending order, and by secondarily sorting alarms with equal weight in descending order of their number of occurrences in the first and second sets.

The method may further include: suppressing a visualization of an alarm flood having the received alarm flood type and providing one or more characterizing alarms instead.

In one embodiment, a computer program product includes instructions that when loaded into a memory of a computer system and executed by at least one processor of the computer system cause the computer system to execute the steps of the computer-implemented method to perform the functions of the computer system as disclosed.

Further aspects of the invention will be realized and attained by means of the elements and combinations particularly depicted in the appended claims. It is to be understood that both, the foregoing general description and the following detailed description are exemplary and explanatory only and are not restrictive of the invention as described.

Figure 1:
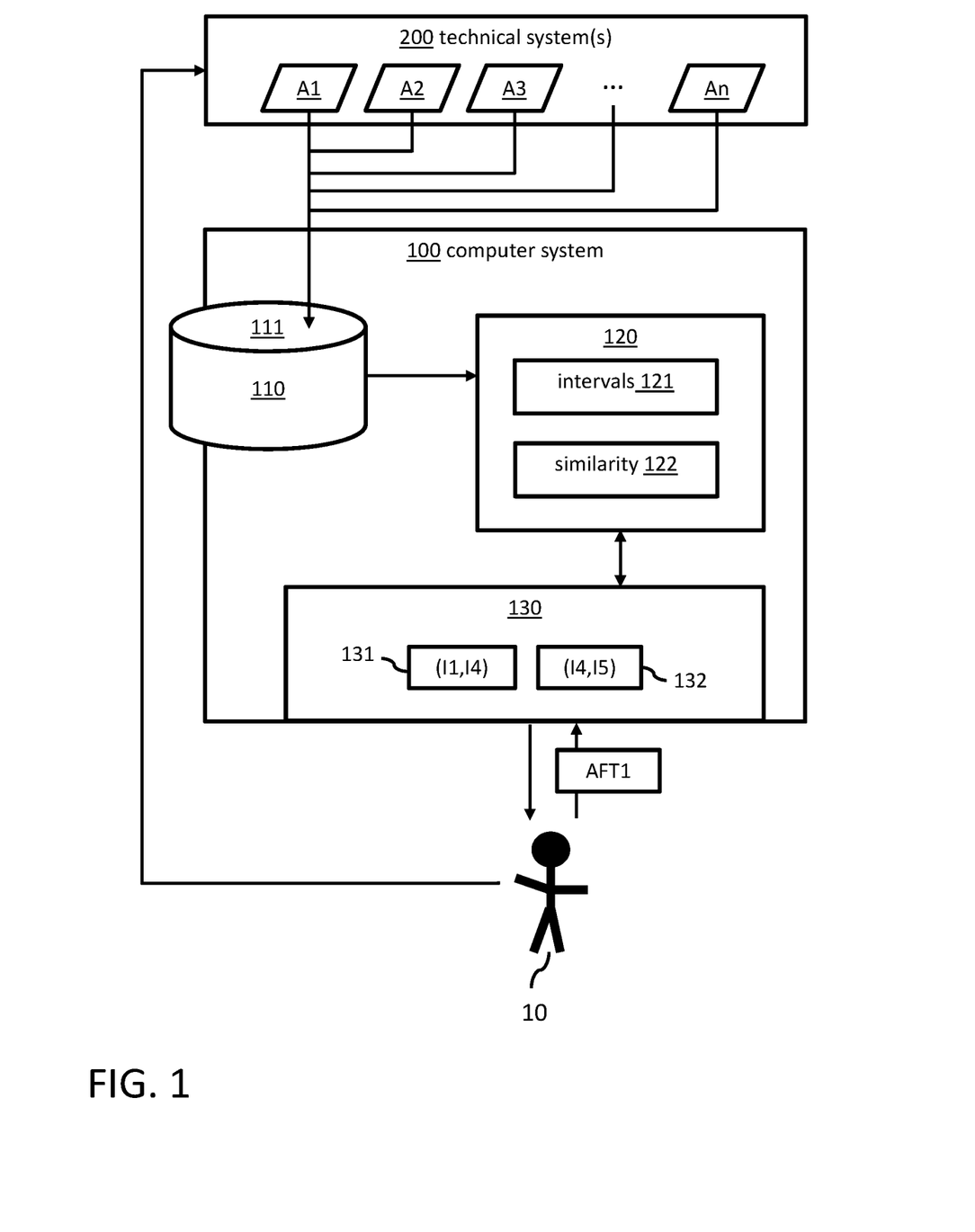
FIG. 1 shows a simplified block diagram of a computer system for processing alarm activations according to an embodiment of the invention.

FIG. 1 shows a simplified block diagram of a computer system 100 for processing alarm activations according to an embodiment of the invention. The computer system is communicatively coupled with one or more technical systems 200. Such technical system(s) typically include monitoring functions to monitor technical system parameters that characterize the technical status of such technical system(s). For example, a technical system can be a production system including production equipment/machinery for producing chemical products or any other product. Other examples for technical systems are automation systems, cars, computers, etc. The type of the technical system is irrelevant in the context of the inventive concept. Typically, such technical systems are equipped with a plurality of sensors to measure technical system parameters characterizing the technical status of the technical system(s). The monitoring functions are then configured to compare the measured parameter values with default values that represent a normal or expected state of the technical system. In other words, the monitoring functions can detect deviations of the technical system parameters from their expected values. For example, if the deviation of a measured parameter value from the expected value exceeds a corresponding threshold value, a corresponding alarm A1 to An can be raised by the respective monitoring function. A particular alarm event being raised is referred to as alarm activation as defined previously. Such alarm activations are then received by the computer system 100 from the communicatively coupled technical system(s). The following description of FIG. 1 discloses the computer system 100 in the context of the computer-implemented method 1000 illustrated by the simplified flowchart of FIG. 2. Therefore, the following description refers to reference numbers of FIGS. 1 and 2. The computer-implemented method 1000 is performed by the various components and elements of the computer system 100.

Figure 2:
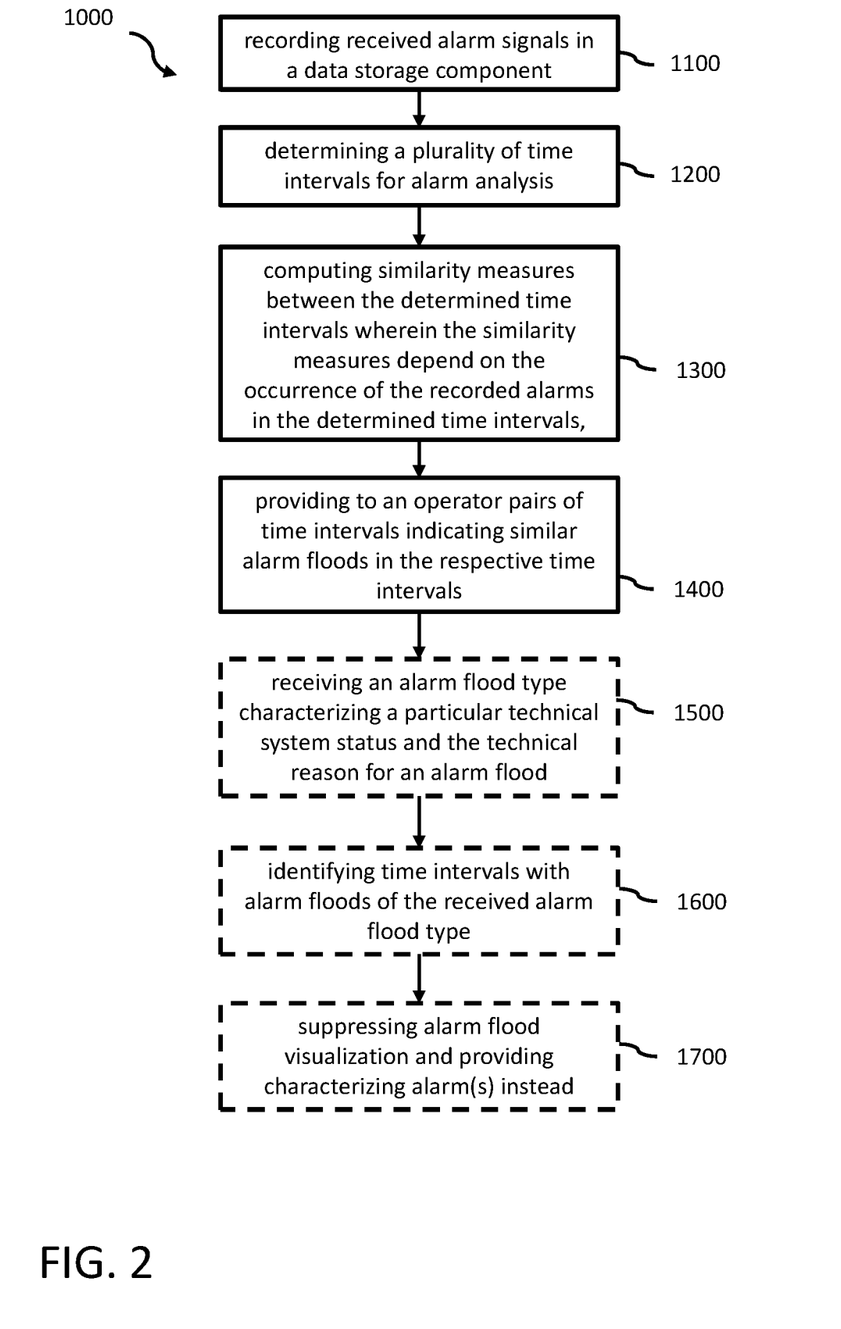
FIG. 2 is a simplified flowchart of a computer-implemented method for processing alarm activations according to an embodiment of the invention.

The computer system 100 has a data storage interface 111 adapted to record 1100 a plurality of received alarm activations in a data storage unit 110 wherein the recorded activations correspond to one or more alarms A1 to An. The data storage interface 111 may be part of a data storage unit 110 of the computer system 100 or it may be adapted to access an external data storage unit (e.g., remote disk, a cloud server, etc.) to perform write and read operations thereon. The received alarm activations may be continuously recorded so that the entire history of the alarm activations raised by the technical system(s) 200 is available to the computer system 100. Alternatively, the received alarm activations may be recorded for limited time periods (e.g., hours, days, weeks, etc.) so that the availability of data recorded in the past is limited to the time horizon of the respective time periods.

The computer system 100 further has a processing component 120 which performs an analysis on the historic alarm data stored in the data storage unit 120. A first function 121 of the processing component 120 determines 1200 a plurality of time intervals for alarm analysis from the recorded alarm activations. Two embodiments for determining the time intervals as disclosed in detail in FIGS. 3A, 3B.

A second function 122 of the processing component 120 computes similarity measures between the determined time intervals. The similarity measures depend on the occurrence of the recorded alarm activations in the determined time intervals. Thereby, the contribution of a particular alarm activation to the similarity of two time intervals is reduced with an increasing occurrence of the alarm in the determined time intervals. In other words, the more often an alarm occurs in determined time intervals other than the two compared intervals the lower is its significance for the similarity measure of the two compared intervals. For example, the similarity measure between a first and a second determined time interval may correspond to a rank which is computed as the sum of coefficients related to alarms occurring in both time intervals wherein the coefficients decrease with the frequency at which an alarm occurs in the determined time intervals. Equation (1) is an example formula which may be used for computing the similarity rank for an interval X with a plurality of intervals Yn (e.g., Y1, Y2, etc.).

$$\text{rank}(X, Yn) = \sum_{i \text{ such that } a_i \text{ occurs in } X \text{ and } Yn} \frac{1}{f(a_i)} \quad (1)$$

Thereby, $f(a_i)$ is the number of the determined intervals in which the alarm $a_i$ occurs. The higher rank(X,Yn) is for the interval X and a particular interval Yn, the more similar the intervals X and Yn are. It is to be noted that any other formula serving the purpose to reduce the significance of frequently occurring alarms in a similarity ranking may be used as well to compute the similarity coefficients for the respective alarms. Given a target interval X that contains an alarm flood, the intervals Yn most similar to A can be identified as follows. First compute for each alarm $a_i$ the number of intervals in which $a_i$ occurs, $f(a_i)$. Then compute rank(X,Yn) for all intervals Yn to be compared with interval X. The most similar intervals to X are those intervals Yn with the highest similarity rank.

The computer system 100 further has a user interface component 130 configured to provide one or more pairs 131, 132 of time intervals to an operator 10 of the one or more technical systems 200 wherein, for example, the one or more pairs 131, 132 of time intervals include time intervals with similarity measures having a value indicating similar alarm floods in the respective time intervals. That is, the user interface component provides alarm information characterizing the technical status of the respective technical system(s) to the operator 10. The similarity function 122 of the computer system is able to identify such pairs of time intervals where a high degree of similarity in the respective alarm floods indicates that the same or similar root cause for the deviation of the technical system from its expected technical status may prevail in both time intervals. This information is provided to the operator 11 as support in identifying the root cause of the alarm floods. For example, a pump engine may fail in a production line. This will typically lead to an alarm about the pump failure. However, a series of subsequent alarms may be generated indicating that in subsequently used equipment units pressure is too low, temperature is too low, flow speed is too low, etc.

For the operator it is normally not possible to identify such similar alarm floods within the entire alarm history quickly enough and to retrieve the relevant information for taking corrective action in the failed technical systems within a reasonable time. The proposed similarity function of the processing component can automatically determine this information from the entire alarm history in less than a second and allows the operator to respond to the alarm in quasi-real-time upon the detection of a particular alarm flood.

In one embodiment, the user interface component 130 is further configured to receive 1500 an alarm flood type AFT1 for the particular alarm flood. For example, the alarm flood type AFT1 may be entered by the operator or another user of the computer system after having analyzed the similar alarm floods of the presented pairs of time intervals. Alternatively, the alarm flood type AFT1 may be automatically identified by a classifier component which can analyze the similar alarm floods, for example, by using commonly known machine learning techniques. The received alarm flood type AFT1 characterizes a particular technical system status and the technical reason for a corresponding alarm flood based on the collection of alarms which are present in the particular alarm flood of the identified pairs of time intervals. Receiving 1500 the alarm flood type may be seen as a kind of setup function for the computer system in view of the following steps.

Upon receipt of the alarm flood type AFT1, the data processing component 120 can identify 1600 a first set of time intervals with alarm floods of the received alarm flood type AFT1. The first set includes time intervals with a collection of alarms corresponding to the collection of alarms characterizing the received alarm flood type AFT1. In other words, the data processing component determines the first set of time intervals by filtering the determined time intervals according to their similarity measures in relation to a time interval including the particular alarm flood. If the respective similarity measures are equal or above the corresponding similarity threshold value the respective time intervals are assigned to the first set. Further, the data processing component can identify a second set of time intervals where the received alarm flood type does not apply. In other words, the determined time intervals which do not pass the filter (i.e., their similarity measures are below the similarity threshold) are assigned to the second set of time intervals.

The processing component can then determine a weight for each alarm occurring in all time intervals of the first set wherein the weight decreases with a growing number of occurrences of the respective alarm in time intervals of the second set. The alarm with the highest weight can then be selected as a characterizing alarm for the received alarm flood type. Equation (2) gives an example of a formula which may be used to compute the weight for identifying characterizing alarms in alarm floods.

For example, in case the question is to identify one or more alarms characterizing a shutdown caused by a power dip, the first set of time intervals may include time intervals with known shutdowns caused by a power dip and the second set may include time intervals with shutdowns known not to be caused by power dips. Identifying characterizing alarms for the respective technical status (e.g., shutdown) of the technical system and the technical reason (e.g., power dip) allows to generate more precise and easier to understand alarm messages to the operators (e.g., "shutdown (probably) caused by power dip" instead of technical names like "UIC-25-1800 trip" and "TT-38-2425 too low" which are typical examples of substantially meaningless alarm names in prior art systems).

For example, a technical system can be shut down for a variety of reasons, such as:

(a) a short-term drop of a supply voltage (so-called power dip);

(b) an interruption of an electrical circuit by a Residual-Current Circuit Breaker (with a number of separate breakers in the system;
(c) the accidental operation of an emergency stop (kill switch);
(d) mechanical problems; and
(e) overheating.

In many cases, one or more characterizing alarms may be identified which can represent the respective situations and their technical reasons. Such characterizing alarms may also be used in search algorithms to find further instances of the specific situation (e.g., shutdowns caused by a power dip).

The first set N of time intervals where the specific situation is present and the second set M of time intervals where the situation is not present can be used as input. For an alarm $a_i$ that occurs in all intervals N, let $m(a_i)$ be the number of intervals from M in which the alarm $a_i$ occurs. If $a_i$ occurs in an interval M, the weight of alarm $a_i$ may be defined as:

$$\text{weight}(a_i) = \frac{1}{m(a_i)} \quad (2)$$

Otherwise, in case the alarm does not occur in any time interval of the second set, weight($a_i$) may be assigned a constant k greater than 1 (e.g., 10) to avoid division by 0. This ensures that the weight of such an alarm is still higher than the weight of an alarm occurring only once in a time interval of the second set resulting in a weight of 1. The alarm with the largest weight may then be selected as the most characteristic alarm for the specific situation. Where two or more alarms have the same highest weight the alarm which occurs in a lower number of time intervals can be weighted higher. For example, if multiple alarms have the same weight, the system may select the alarm for which $$\frac{1}{f(a_i)}$$

is lower as the characterizing alarm.

The system may also select a plurality of characterizing alarms for the received alarm flood type by primarily sorting the alarms of the first set by weight in descending order, and by secondarily sorting alarms with equal weight in descending order of their number of occurrences in the first and second sets. For example, to obtain multiple characteristic alarms, the secondary sorting (if weight is equal) may be in ascending order by $$\frac{1}{f(a_i)}.$$

The identified characteristic alarms can then be used for the identification of the specific situation which corresponds to said technical status of the corresponding technical system and the technical reason for this status. A final verification if one or more identified alarms are really characteristic for the specific situation (e.g., shutdown caused by power dip) may be done by a human expert (e.g., the operator or another user).

In one embodiment, the processing component may substitute an identified alarm flood with one or more characterizing alarms. The characterizing alarms may be renamed with meaningful headers describing the technical status and the technical reason which caused the alarm flood. In this embodiment, the user interface 130 can suppressing 1700 the visualization of the identified alarm flood having a particular alarm flood type and provide to the operator in quasi-real-time the one or more characterizing alarms instead. This enables the operator to quickly respond to an alarm flood in identifying the causing technical status and technical reason and take corrective action in the respective technical system.

Figure 3A:
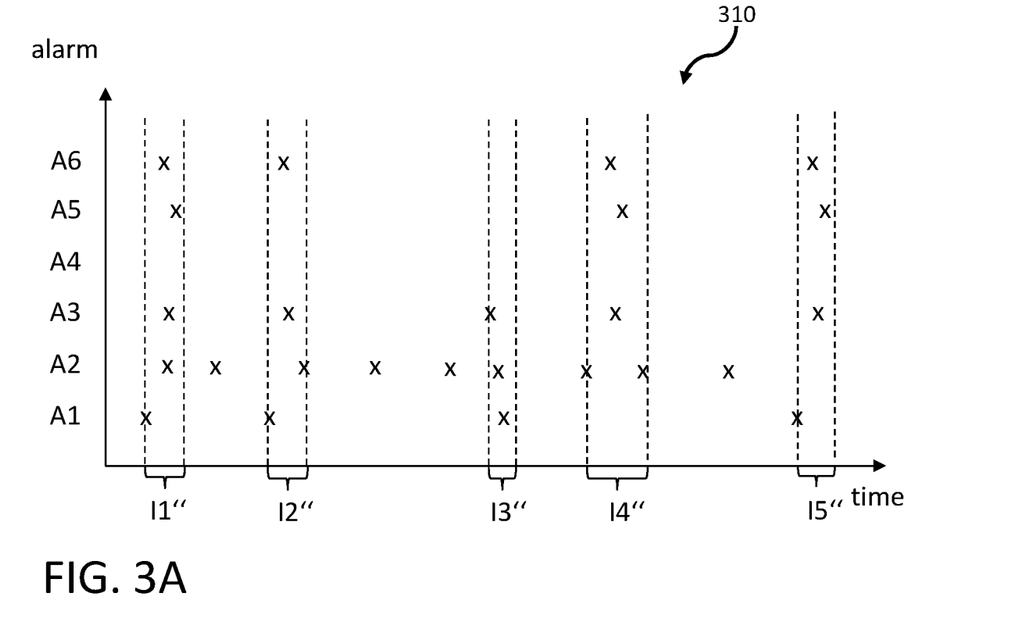
FIGS. 3A, 3B illustrate two embodiments for determining time intervals for alarm processing.

FIGS. 3A and 3B illustrate two embodiments for determining time intervals for alarm processing. In FIG. 3A, a particular time interval of the plurality of time intervals I1″ to I2″ is determined if the alarm activation rate exceeds a predefined alarm threshold value per predefined time unit. The diagram 310 shows a plurality of alarm activations x occurring over time. Each alarm activation x is an instance of a corresponding alarm A1 to A6. In this embodiment, the data processing component determines the rate of alarm activations (number of alarm activations per predefined time interval). For example, the number of alarm activations per minute or per hour can be derived from the recorded history data. A predefined threshold value for the alarm rate is used as a trigger value for detecting the start of a determined time interval when the alarm rate exceeds the threshold value. The end of the determined time interval is triggered when the alarm rate falls back to the threshold value or beneath the threshold value. In the example, the time intervals I1″ to I5″ are determined as relevant time intervals for subsequent alarm flood analysis. The durations of the determined time intervals depend on the time periods in which the alarm rate constantly exceeds the threshold value. That is, in general each determined time interval will show a different length. The advantage of this embodiment is that time periods with an alarm rate equal or lower to the threshold are filtered out. That is, the alarm activations received during such periods will not be subject to further processing during the alarm flood analysis which saves computing resources during the alarm flood analysis steps.

Figure 3B:
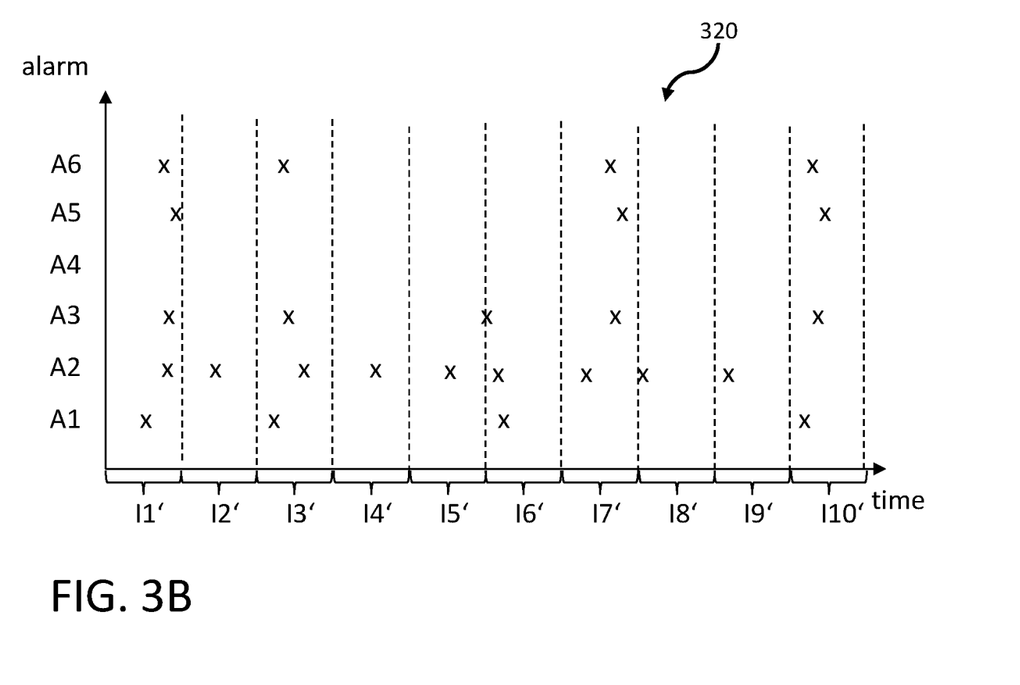

The second embodiment illustrated in FIG. 3B shows how a particular time interval of the plurality of time intervals I1' to I10' is determined by a fixed starting time and a fixed time length. The diagram 320 shows again a plurality of alarm activations x occurring over time where each alarm activation x is an instance of the corresponding alarms A1 to A6. In this embodiment, the determined time intervals may be equidistant or they may be predefined based on experience gained from historic data in the past. For example, determined time intervals during production times may be shorter compared to determined time intervals during production breaks (idle times). In this embodiment there is no need for computing the alarm activation rates. However, a particular alarm flood may be spread over multiple determined time intervals and all determined time intervals are subject to the following alarm flood analysis.

Figure 4:
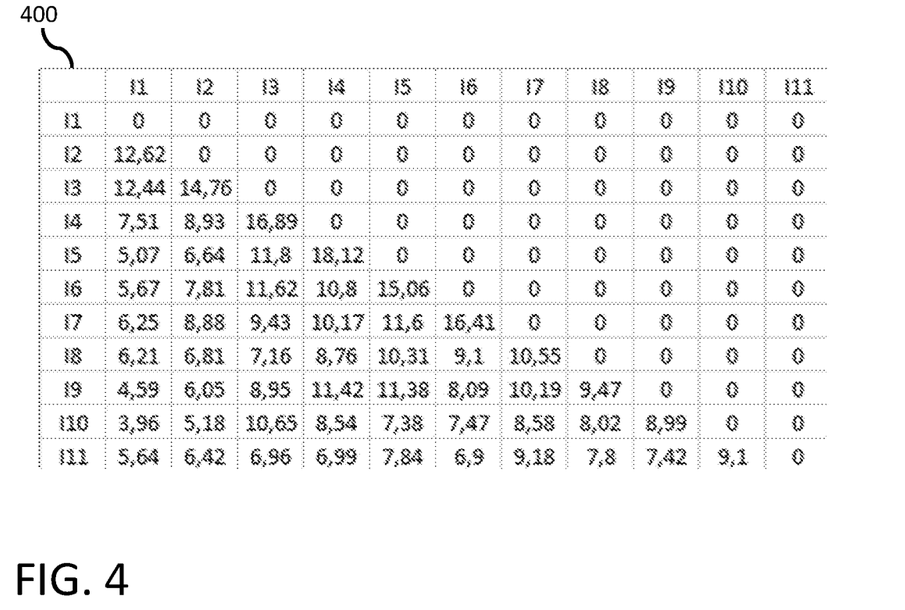
FIG. 4 shows a table with examples of similarity figures for pairs of time intervals determined according to an embodiment of the invention.

FIG. 4 shows a table 400 with examples of similarity figures for pairs of time intervals determined according to an embodiment of the invention. In the example, for eleven determined time intervals I1 to I11 pairwise similarity measures are computed and presented in a matrix. An operator may be prompted with this information. The table shows that, for example, I1 has a significantly higher and comparable similarity with I2 (12.62) and I3 (12.44) than with any of the subsequent determined time intervals. I2 has a significantly higher similarity (14.76) with I3 than with any of the subsequent time intervals. I1, I2 and I3 may include alarm floods related to the same technical status and technical reason of the respective technical system(s). However, the validation of this assumption may be subject to further analysis of such time intervals. For example, the similarity values with the corresponding pairs of intervals may be sorted in descending order by the similarity measures. An operator may then work through the intervals in the order of the similarities until only pairs of intervals of no interest remain. That is, the similarity threshold for intervals of interest in this case is determined dynamically by the operator. Alternatively, the system may use a predefined similarity threshold (e.g., similarity measure >=10) as a filter criterion to make a preselection of pairs for the operator.

Figure 5:
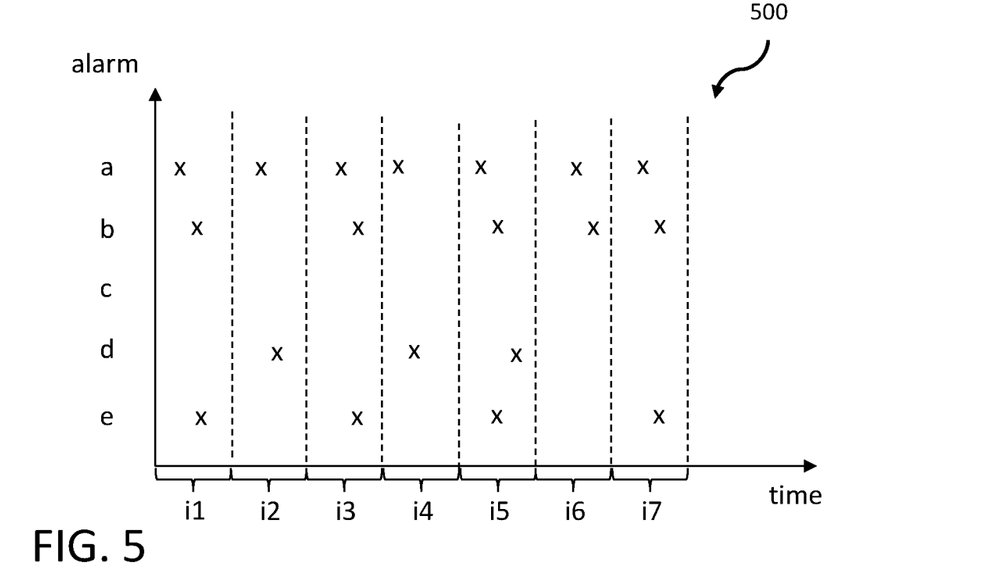
FIG. 5 shows an example scenario for identifying characterizing alarms according to an embodiment of the invention.

FIG. 5 shows an example scenario for identifying characterizing alarms according to an embodiment of the invention. The diagram 500 illustrates alarm activations x of alarms a, b, c, d, e over time. In the example, the determined intervals i1 to i7 are defined according to the embodiment shown in FIG. 3B.

In the example, the alarms a to e represent the following situations:
a→unplanned shutdown
b→bearing temperature too high
c→low power
d→software error
e→maximum speed exceeded Time intervals i1, i3, i7 include alarm floods with the alarms a, b, e. The alarm flood type for these alarm floods is specified as "Overload". "Overload" represents the technical status "unplanned shutdown" of the respective technical system with the technical reason "overload" (too high bearing temperature, too high speed). Time interval i5 also includes an alarm flood with the alarms a, b, e and, in addition, it includes the alarm d. Nevertheless, the alarm flood is also specified with the alarm flood type "Overload".

Time intervals i2, i4 include alarm floods with the alarms a, d. The alarm flood type for these alarm floods is specified as "Software" representing the technical status "unplanned shutdown" of the respective technical system with the technical reason "software error".

The interval i6 includes an alarm flood with the alarms a, b. The alarm flood type for this alarm flood is specified as "Mechanical Problem" representing the technical status "unplanned shutdown" with the technical reason "mechanical problem" derived from the too high bearing temperature.

To select one or more characterizing alarms for the respective alarm flood types, the computer system can determine the weights for the respective alarms, for example, in accordance with equation (2). In the example, alarms a, b, e occur in all four time intervals i1, i3, i5, i7 with the alarm flood type "Overload" (first set of time intervals). That is, alarms a, b, e are characteristic for the "Overload" situation. Alarm a also occurs in all other 3 time intervals i2, i4, i6 which are not related to the "Overload" situation (second set of time intervals). Therefore, the weight of alarm a is computed as weight(a)=⅓. Alarm b also occurs in time interval i6 which is not related to the "Overload" situation (second set of time intervals). Hence, the weight of alarm b is computed as weight(b)=1/1. Alarm e does not occur in any time interval of the second set. Therefore, the weight for alarm e is assigned a constant k>1 resulting in weight(e)=k.

Alarm e (maximum speed exceeded) has the highest weight of the alarms occurring in the first set of time intervals for the "Overload" situation and is therefore selected as the characterizing alarm for alarm floods of alarm flood type "Overload". When the processing component is now performing the similarity analysis on incoming alarm floods (i.e., alarm floods which were just being recorded after time interval i7) it can identify an alarm flood of the alarm flood type "Overload" based on the computed similarity measures with previously determined "Overload" time intervals. For example, an alarm flood received after i7 may include the alarms a, b, c, e. This alarm flood will be automatically recognized as "Overload" situation. The computer system may now suppress the indication of the respective alarm activations to the operator. Instead, the system may simply provide to the operator the characterizing alarm e (maximum speed exceeded) or it may even provide the alarm flood type information "Overload" to the operator characterizing the technical status "unplanned shutdown" with the technical reason "overload". The reduction of distracting information in alarm floods supports the operator in quickly recognizing the root cause for the received alarm flood and take corrective action in the affected technical systems, accordingly.

Figure 6:
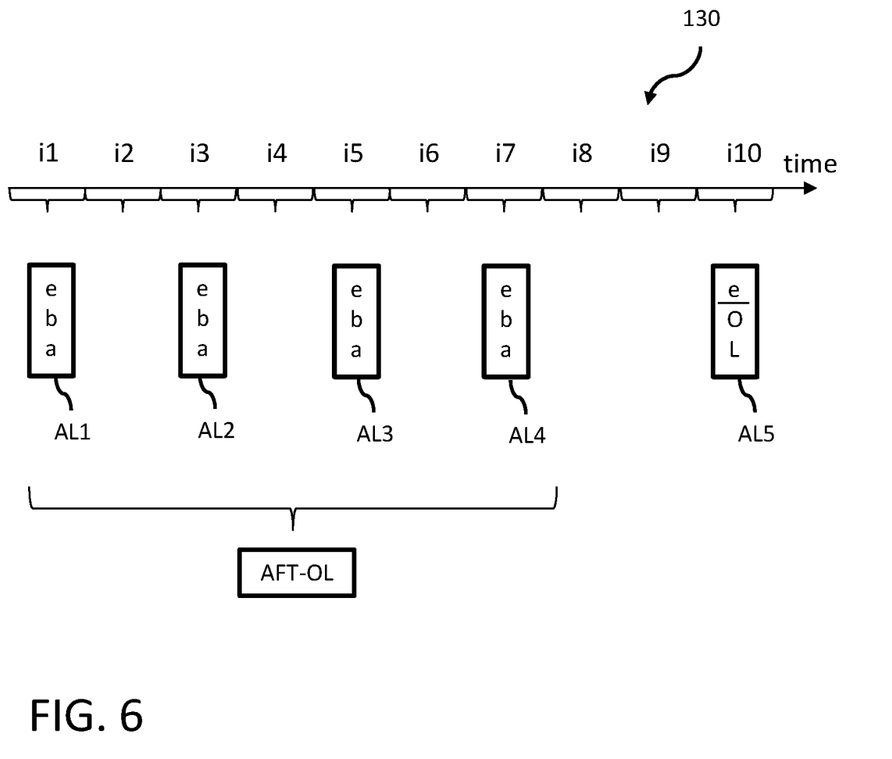
FIG. 6 shows and example embodiment of a user interface for providing alarm flood information to an operator according to an embodiment of the invention.

FIG. 6 shows a schematic example embodiment of a user interface 130 for providing alarm flood information to an operator according to an embodiment of the invention. The example alarms of FIG. 5 are used again. In the example, for pairs of time intervals with the alarms a, b, e occurring in both intervals (e.g., (i1, i3), (i1, i5), (i3, i5), etc.) are provided as alarm lists AL1 to AL4 to the operator. In the example, the alarms are sorted in descending order with regards to their occurrences in all determined time intervals (order e, b, a) in accordance with their respective ranks as computed by using equation (1). The computer system receives the alarm flood type AFT-OL for the alarm floods in the determined time intervals i1, i3, i5, i7. The alarm flood type AFT-OL ("Overload") may be received as input from the user (operator) of the system or it may be determined automatically, e.g., by machine learning algorithms applied to the historic alarm flood data. After the determined time interval i7 the system knows that alarm floods with the alarms a, b, e are likely associated with the alarm flood type AFT-OL. As a result, the system may have determined and selected the characterizing alarm e (see FIG. 5) to represent future alarm floods of alarm flood type AFT-OL. In the example, an alarm flood including the alarms a, b, c, e is received during the determined time interval i10. The alarm flood is associated with the alarm flood type AFT-OL and the alarm list AL5 provided to the operator may only include the characterizing alarm e, or alternatively, it may include another representation OL ("Overload") of the identified alarm flood type which indicates to the operator the technical status/technical reason which caused the alarm flood in time interval i10. The remaining alarms a, b, c may all be suppressed in the alarm list AL5 to not distract the operator and support quick recognition of the actual root cause behind the alarm flood.

Figure 7:
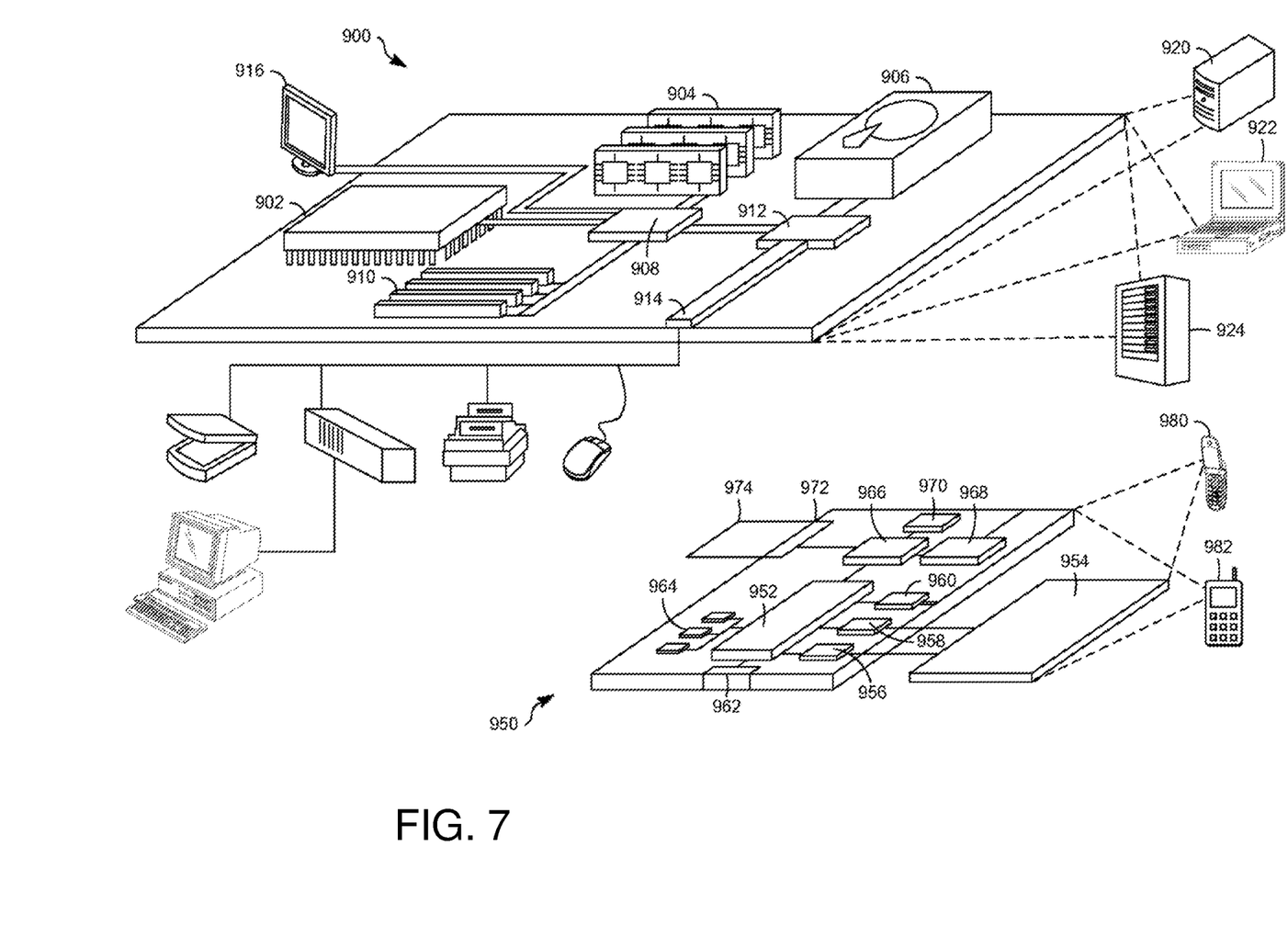
FIG. 7 is a diagram that shows an example of a generic computer device and a generic mobile computer device, which may be used with the techniques described here.

FIG. 7 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to a computer system 100 as illustrated in FIG. 1. Computing device 950 is intended to represent various forms of mobile devices, such as personal digital assistants, cellular telephones, smart phones, and other similar computing devices. For example, computing device 950 may be used by an operator for communication with the computer system 100. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, EDGE, UMTS, LTE, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a backend component (e.g., as a data server), or that includes a middleware component (e.g., an application server), or that includes a front end component (e.g., a client computer having a graphical user interface or a Web browser through which a user can interact with an implementation of the systems and techniques described here), or any combination of such backend, middleware, or frontend components. The components of the system can be interconnected by any form or medium of digital data communication (e.g., a communication network). Examples of communication networks include a local area network ("LAN"), a wireless local area network ("WLAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer system configured to process alarm activations received from one or more technical systems, wherein a particular alarm activation represents a deviation of the technical status of a particular technical system from its normal technical status, the computer system comprising:
   a data storage interface configured to record a plurality of received alarm activations in a data storage unit, wherein the recorded alarm activations correspond to one or more alarms;
   a data processor configured:
      to determine, from the recorded alarm activations, a plurality of time intervals for alarm analysis; and
      to compute similarity measures between the determined time intervals, wherein the similarity measures depend on the occurrence of the recorded alarm activations in the determined time intervals, and wherein the contribution of a particular alarm activation to the similarity of two time intervals is reduced with an increasing occurrence of the alarm in the determined time intervals; and
   a user interface configured to provide one or more pairs of time intervals to an operator of the one or more technical systems wherein the one or more pairs of time intervals include time intervals with similarity measures indicating similar alarm floods in the respective time intervals.

2. The computer system of claim 1, wherein the similarity measure between a first determined time interval and a second determined time interval corresponds to a rank, which is computed as the sum of coefficients related to alarms occurring in both time intervals, wherein the coefficients decrease with the frequency at which an alarm occurs in the determined time intervals.

3. The computer system of claim 1, wherein:
   the user interface is further configured to receive an alarm flood type, the alarm flood type characterizing a particular technical system status and the technical reason for a corresponding alarm flood based on the collection of alarms in the particular alarm flood; and
   the data processor is further configured to identify a first set of time intervals with alarm floods of the received alarm flood type, the first set including time intervals with a collection of alarms corresponding to the collection of alarms characterizing the received alarm flood type.

4. The computer system of claim 3, wherein the data processor is further configured:
   to identify a second set of time intervals where the received alarm flood type does not apply;
   to determine a weight for each alarm occurring in all time intervals of the first set, wherein the weight decreases with a growing number of occurrences of the respective alarm in time intervals of the second set; and
   to select the alarm with the highest weight as a characterizing alarm for the received alarm flood type.

5. The computer system of claim 4, wherein for two alarms with the same highest weight, the alarm that occurs in a lower number of time intervals is weighted higher.

6. A computer-implemented method for processing alarm activations received from one or more technical systems wherein a particular alarm activation represents a deviation of the technical status of a particular technical system from its normal technical status, the method comprising:
   recording a plurality of received alarm activations in a data storage component, wherein the recorded alarm activations correspond to one or more alarms;
   determining a plurality of time intervals for alarm analysis from the recorded alarm activations;
   computing similarity measures between the determined time intervals, wherein the similarity measures depend on the occurrence of the recorded alarm activations in the determined time intervals, and wherein the contribution of a particular alarm activation to the similarity of two time intervals is reduced with an increasing occurrence of the alarm in the determined time intervals; and
   providing pairs of time intervals to an operator of the one or more technical systems, wherein the pairs of time intervals include time intervals with similarity measures indicating similar alarm floods in the respective time intervals.

7. The method of claim 6, wherein a particular time interval of the plurality of time intervals is determined if the alarm activation rate exceeds a predefined alarm threshold value per predefined time unit.

8. The method of claim 6, wherein a particular time interval of the plurality of time intervals is determined by a fixed starting time and a fixed time length.

9. The method of claim 6, wherein the similarity measure between a first determined time interval and a second determined time interval corresponds to a rank, which is computed as the sum of coefficients related to alarms occurring in both time intervals, and wherein the coefficients decrease with the frequency at which an alarm occurs in the plurality of determined time intervals.

10. The method of claim 6, further comprising:
    receiving an alarm flood type, the alarm flood type characterizing a particular technical status of the technical system and the technical reason for a corresponding alarm flood based on the collection of alarms in the particular alarm flood; and
    identifying a first set of time intervals with alarm floods of the received alarm flood type, the first set including time intervals with a collection of alarms corresponding to the collection of alarms characterizing the received alarm flood type.

11. The method of claim 10, further comprising:
    identifying a second set of time intervals where the received alarm flood type does not apply;
    determining a weight for each alarm occurring in all time intervals of the first set, wherein the weight decreases with a growing number of occurrences of the respective alarm in time intervals of the second set; and
    selecting the alarm with the highest weight as a characterizing alarm for the received alarm flood type.

12. The method of claim 11, wherein for two alarms with the same highest weight the alarm which occurs in a lower number of time intervals is weighted higher.

13. The method of claim 11, wherein selecting further comprises:
    selecting a plurality of characterizing alarms for the received alarm flood type by primarily sorting the alarms of the first set by weight in descending order, and by secondarily sorting alarms with equal weight in descending order of their number of occurrences in the first and second sets.

14. The method of claim 10, further comprising:
    suppressing a visualization of an alarm flood having the received alarm flood type and providing one or more characterizing alarms instead.

15. A computer program product comprising instructions that when loaded into a memory of a computing device and executed by at least one processor of the computing device cause the computing device to execute the steps of a computer-implemented method comprising:

recording a plurality of received alarm activations in a data storage component wherein the recorded alarm activations correspond to one or more alarms;

determining a plurality of time intervals for alarm analysis from the recorded alarm activations;

computing similarity measures between the determined time intervals wherein the similarity measures depend on the occurrence of the recorded alarm activations in the determined time intervals, and wherein the contribution of a particular alarm activation to the similarity of two time intervals is reduced with an increasing occurrence of the alarm in the determined time intervals; and providing pairs of time intervals to an operator of the one or more technical systems wherein the pairs of time intervals include time intervals with similarity measures indicating similar alarm floods in the respective time intervals.

16. A computer-implemented method for processing alarm activations received from one or more technical systems, wherein each of the alarm activations respectively represents a particular deviation of a technical status of a particular technical system from a normal technical status, the method comprising:

recording, as historic alarm data, the received alarm activations in a data storage component, wherein the recorded alarm activations correspond to one or more alarms, and wherein each of the recorded alarm activations are recorded in association with a corresponding time of occurrence;

subdividing the historic alarm data into a plurality of time intervals for alarm analysis, wherein each of the time intervals of the historic alarm data is associated with a corresponding set of the recorded alarm activations occurring within the respective one of the time intervals;

computing respective similarity ranks for a time interval X with respect to each of a plurality of time intervals Yn, wherein the plurality of time intervals of the historic alarm data comprises the time interval X and the time intervals Yn, wherein a respective similarity rank, of the similarity ranks, for a particular pair of the time interval X with a respective one of the time intervals Yn depends on an occurrence of the recorded alarm activations in the particular pair, and wherein a contribution of a particular alarm activation to the calculation of the respective similarity rank of the particular pair is inversely proportional to an occurrence of the particular alarm activation in the time intervals of the historic alarm data outside of the particular pair; and providing to an operator the respective similarity ranks, indicating a similarity of alarm floods among the time intervals.

* * * * *